US010637357B1

(12) United States Patent
Zhan et al.

(10) Patent No.: US 10,637,357 B1
(45) Date of Patent: Apr. 28, 2020

(54) RAMP OFFSET COMPENSATION CIRCUIT IN A BUCK BOOST CONVERTER

(71) Applicant: RENESAS ELECTRONICS AMERICA INC., Milpitas, CA (US)

(72) Inventors: Xiaodong Zhan, McKinney, TX (US); Prabhjot Singh, San Jose, CA (US); Long Yu, Hangzhou (CN)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/226,400

(22) Filed: Dec. 19, 2018

Related U.S. Application Data

(60) Provisional application No. 62/608,348, filed on Dec. 20, 2017.

(51) Int. Cl.
*H02M 3/158* (2006.01)
*H02M 3/157* (2006.01)
*G05F 1/62* (2006.01)
*H02M 1/00* (2006.01)

(52) U.S. Cl.
CPC ............ *H02M 3/1582* (2013.01); *G05F 1/62* (2013.01); *H02M 3/157* (2013.01); *H02M 2001/0032* (2013.01)

(58) Field of Classification Search
CPC .... H02M 3/156–3/158; H02M 3/1582; H02M 3/1584; H02M 3/1588; H02M 2001/0032; H02M 2001/0045; G05F 1/10; G05F 1/24; G05F 1/56; G05F 1/575; G05F 1/62; G05F 1/618; Y02B 70/126; Y02B 70/1466

USPC ....... 323/222, 225, 259, 268, 271, 282–285, 323/299, 344
See application file for complete search history.

(56) References Cited

U.S. PATENT DOCUMENTS

| | | | |
|---|---|---|---|
| 5,969,513 A * | 10/1999 | Clark | G05F 3/262 323/282 |
| 7,495,419 B1 | 2/2009 | Ju | |
| 8,232,789 B2 | 7/2012 | Moussaoui | |
| 8,305,055 B2 * | 11/2012 | Wu | G05F 1/10 323/259 |
| 8,436,591 B2 | 5/2013 | Dearn | |
| 8,692,533 B2 * | 4/2014 | Chen | H02M 3/1582 323/284 |

(Continued)

*Primary Examiner* — Yemane Mehari
(74) *Attorney, Agent, or Firm* — Foley & Lardner LLP

(57) ABSTRACT

A converter includes a buck boost converter circuit to generate an output voltage in response to an input voltage, and an inductor current compensation circuit to generate an output current compensated inductor current signal corresponding to a sensed input current. The output current compensated inductor current signal includes a voltage gap between a boost ramp valley and a buck ramp peak. The buck boost converter circuit includes a current sensor to receive the input voltage, the current sensor to sense an input current corresponding to the input voltage, an upper buck transistor coupled to the input voltage node, an upper boost transistor coupled to an output voltage node to output the output voltage, and an inductor coupled between the upper buck transistor and the upper boost transistor. The inductor current compensation circuit adjusts the voltage gap based on an offset compensation voltage corresponding to a switching frequency.

20 Claims, 11 Drawing Sheets

(56) References Cited

U.S. PATENT DOCUMENTS

| | | | |
|---|---|---|---|
| 8,773,084 B2 | 7/2014 | Casey et al. | |
| 8,860,387 B2 * | 10/2014 | Kobayashi | H02M 3/1582 323/259 |
| 9,041,363 B2 * | 5/2015 | Tanabe | H02M 3/1582 323/259 |
| 9,088,211 B2 | 7/2015 | Ivanov et al. | |
| 9,525,350 B2 | 12/2016 | Hari et al. | |
| 9,614,443 B2 | 4/2017 | Kay et al. | |
| 9,627,975 B2 | 4/2017 | Khlat et al. | |
| 9,660,533 B2 | 5/2017 | Choudhary | |
| 9,882,488 B2 | 1/2018 | Houston | |
| 2011/0187336 A1 * | 8/2011 | Wu | G05F 1/10 323/282 |

* cited by examiner

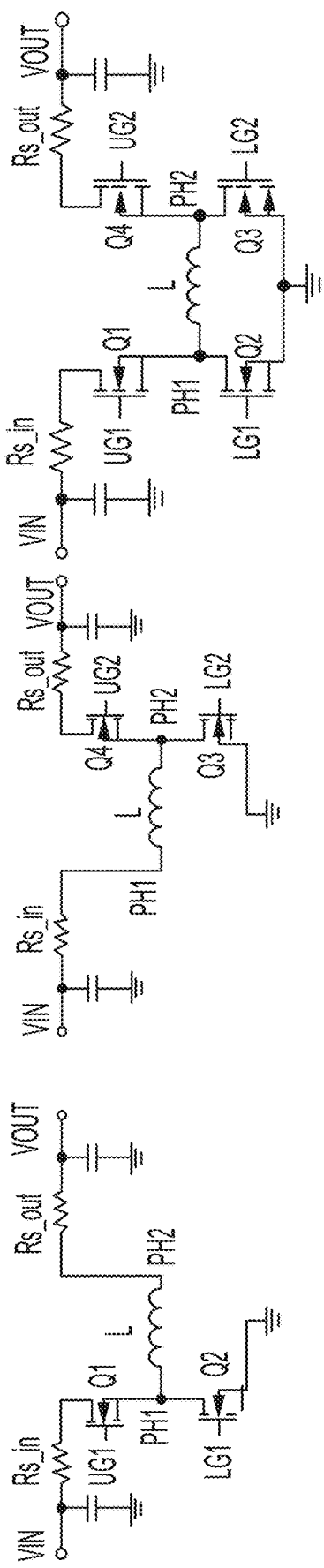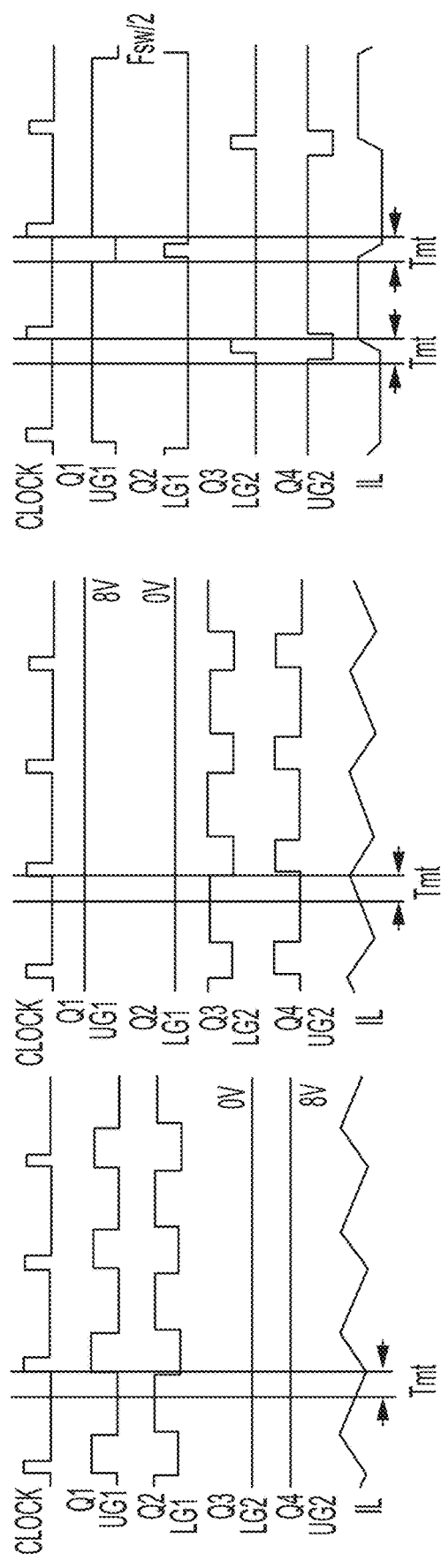
FIG. 4A  FIG. 4B  FIG. 4C

RAMP OFFSET COMPENSATION CIRCUIT IN A BUCK BOOST CONVERTER

CROSS-REFERENCE TO RELATED PATENT APPLICATIONS

This application claims priority to, and the benefit of, U.S. Provisional Application No. 62/608,348, filed on Dec. 20, 2017, which is incorporated herein by reference in its entirety.

TECHNICAL FIELD

The present embodiments relate generally to buck-boost converters, and systems and methods of driving the buck-boost converters.

BACKGROUND

A buck boost converter is a type of DC-DC converter that is capable of providing a positive output voltage that is higher or lower than its input voltage. As battery powered devices are becoming more and more popular, this topology is becoming more attractive as it can make use of the discharge cycles of a battery. When a battery input voltage is higher than its output voltage, a buck boost converter works in the buck mode of operation. In the buck mode of operation, the converter decreases the input voltage to a suitable level for use at its output. When the battery input voltage is lower than the output voltage, the buck boost converter works in the boost mode of operation wherein the input voltage is increased to a suitable level at the output.

It is relatively easy to implement the control in either a pure buck mode of operation or a pure boost mode of operation by leaving some power switches turned on or off. The challenge remains in the transition between the buck and boost modes of operation when the output voltage is close to the input voltage. In the buck-boost mode transition, a voltage gap is generated between a boost ramp valley and buck ramp peak. In the voltage gap area, a buck cycle of the buck-boost mode runs in maximum duty and a boost cycle of the buck-boost mode runs in minimum duty. Generally, there is no duty cycle modulation to overcome an input voltage change in the voltage gap area, and thus, the output voltage generally follows the input voltage, which leads to poor line transient response.

SUMMARY

According to an example embodiment, a converter includes: a buck boost converter circuit configured to generate an output voltage in response to an input voltage, the buck boost converter circuit including: a current sensor coupled to an input voltage node configured to receive the input voltage, the current sensor configured to sense an input current corresponding to the input voltage; an upper buck transistor coupled to the input voltage node; an upper boost transistor coupled to an output voltage node, the output voltage node configured to output the output voltage; and an inductor coupled between the upper buck transistor and the upper boost transistor; and an inductor current compensation circuit configured to generate an output current compensated inductor current signal corresponding to the sensed input current, the output current compensated inductor current signal including a voltage gap between a boost ramp valley and a buck ramp peak. The inductor current compensation circuit is configured to adjust the voltage gap based on an offset compensation voltage corresponding to a switching frequency.

In some embodiments, the inductor current compensation circuit may include: a boost ramp offset compensation circuit configured to generate the offset compensation voltage corresponding to the switching frequency; and a boost ramp generation circuit configured to generate a boost ramp of the output current compensated inductor current signal corresponding to the offset compensation voltage.

In some embodiments, the boost ramp offset compensation circuit may include a current mirror coupled to a current source configured to generate a current corresponding to the switching frequency, the current mirror configured to generate a mirrored current corresponding to the current generated by the current source.

In some embodiments, the boost ramp offset compensation circuit may further include a resistor coupled to receive the mirrored current from the current mirror, the resistor configured to generate a boost side adjustment voltage corresponding to the mirrored current.

In some embodiments, the boost ramp offset compensation circuit may further include an amplifier coupled to the resistor, the amplifier configured to generate the offset compensation voltage corresponding to the boost side adjustment voltage and to provide the offset compensation voltage to the boost ramp generation circuit.

In some embodiments, parameters of the current mirror, the resistor, and the amplifier may correspond proportionally to a total minimum on and off time in a boost cycle or a buck cycle.

In some embodiments, the converter may further include a mode control logic circuit configured to generate a mode control signal to control an operation mode of the buck boost converter circuit to operate in one of a buck mode, a boost mode, and a buck-boost mode. In some embodiments, the inductor current compensation circuit may be configured to adjust a boost ramp based on the offset compensation voltage corresponding to the switching frequency when the mode control signal indicates a boost cycle within the buck-boost mode.

According to another example embodiments, an inductor current compensation circuit configured to generate an output current compensated inductor current signal corresponding to a sensed input current provided by a buck boost converter, includes: a boost ramp offset compensation circuit configured to generate an offset compensation voltage corresponding to a switching frequency; and a boost ramp generation circuit configured to generate a boost ramp of the output current compensated inductor current signal corresponding to the offset compensation voltage. The inductor current compensation circuit is configured to generate the output current compensated inductor current signal having a voltage gap between a boost ramp valley and a buck ramp peak, and to adjust the voltage gap based on the offset compensation voltage corresponding to the switching frequency.

In some embodiments, the boost ramp offset compensation circuit may include a current mirror coupled to a current source configured to generate a current corresponding to the switching frequency, the current mirror configured to generate a mirrored current corresponding to the current generated by the current source.

In some embodiments, the boost ramp offset compensation circuit may further include a resistor coupled to receive the mirrored current from the current mirror, the resistor configured to generate a boost side adjustment voltage corresponding to the mirrored current.

In some embodiments, the boost ramp offset compensation circuit may further include an amplifier coupled to the resistor, the amplifier configured to generate the offset compensation voltage corresponding to the boost side adjustment voltage and to provide the offset compensation voltage to the boost ramp generation circuit.

In some embodiments, parameters of the current mirror, the resistor, and the amplifier may correspond proportionally to a total minimum on and off time in a boost cycle or a buck cycle.

In some embodiments, the inductor current compensation circuit may be configured to adjust a boost ramp based on the offset compensation voltage corresponding to the switching frequency when a mode control signal received from a mode control logic circuit indicates a boost cycle within a buck-boost mode.

According to another embodiment, a method for generating an output current compensated inductor current signal corresponding to a sensed input current provided by a buck boost converter circuit configured to generate an output voltage in response to an input voltage, includes: receiving, from the buck boost converter circuit, the sensed input current corresponding to the input voltage; and generating the output current compensated inductor current signal corresponding to the sensed input current, the output current compensated inductor current signal having a voltage gap between a boost ramp valley and a buck ramp peak. The voltage gap is adjusted based on a boost ramp offset compensation voltage corresponding to a switching frequency.

In some embodiments, the method may further include: generating a boost ramp of the output current compensated inductor current signal corresponding to the boost ramp offset compensation voltage.

In some embodiments, the method may further include: generating a current corresponding to the switching frequency; and generating a mirrored current based on the current corresponding to the switching frequency.

In some embodiments, the method may further include: generating a boost side adjustment voltage corresponding to the mirrored current.

In some embodiments, the method may further include: generating the boost ramp offset compensation voltage based on the boost side adjustment voltage; and adjusting the boost ramp of the output current compensated inductor current signal corresponding to the boost ramp offset compensation voltage to generate the voltage gap.

In some embodiments, the method may further include: selecting parameters of a current mirror for generating the mirrored current, a resistor for generating the boost side adjustment voltage, and an amplifier for generating the boost ramp offset compensation voltage to proportionally correspond to a total minimum on and off time in a boost cycle or a buck cycle.

In some embodiments, the method may further include: receiving a mode control signal to control an operation mode of the buck boost converter circuit to operate in one of a buck mode, a boost mode, or a buck-boost mode; and generating the output current compensated inductor current signal having the voltage gap that is adjusted corresponding to the boost ramp offset compensation voltage when the mode control signal indicates a boost cycle within the buck-boost mode.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIGS. 4A-4C illustrate waveform diagrams for driving the buck boost converter of FIG. 3 in various modes, according to some embodiments;

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art.

One or more embodiments of the present disclosure relate to current control voltage compensation schemes of buck boost converters, and to systems and methods for compensating for a variation in a voltage gap (Vgap) between a boost ramp valley and a buck ramp peak attributed to a change in a switching frequency to achieve improved line transient responses. In some embodiments, an inductor current compensation circuit includes a boost ramp offset compensation circuit to apply a boost side clamp voltage corresponding to the switching frequency to a boost ramp generation circuit. In some embodiments, the boost side clamp voltage is generated corresponding to the switching frequency so that the boost ramp generated by the boost ramp generation circuit is adjusted corresponding to a change in the switching frequency, and thus, adjusting the boost ramp valley side of the Vgap. Accordingly, in some embodiments, a fixed or substantially fixed Vgap is generated irrespective of the switching frequency to improve line transient response.

Figure 1:
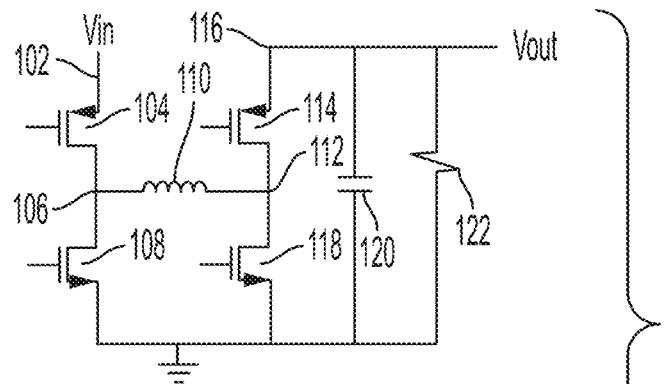
FIG. 1 is a schematic diagram of a buck boost converter.
Figure 1:
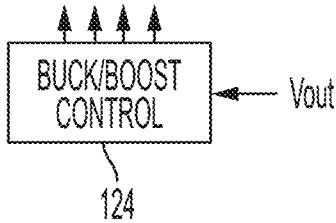

Referring now to the drawings, and more particularly to FIG. 1, there is illustrated a schematic diagram of a buck boost converter. The buck boost converter includes an input voltage node 102 into which an input voltage VIN is applied. A high side buck transistor 104 comprises a P-channel transistor having its source/drain path connected between node 1.02 and node 106. A low side buck transistor 108 comprises an N-channel transistor having its drain; source path connected between node 106 and ground. An inductor 110 is connected between node 106 and node 112. A high side P-channel boost transistor 114 has its source drain path connected between an output voltage node VOUT 116 and node 112. A low side boost transistor 118 comprises an N-channel transistor having its source/drain path connected between node 112 and ground. An output capacitor 120 is connected between the output voltage node 116 and ground. An output load resistor 122 is connected in parallel with the capacitor 120 between node 116 and ground. Each of the high side buck transistor 104, low side buck transistor 108, high side boost transistor 114, and low side boost transistor 118 have gates connected to a buck boost control circuit 124. The buck boost control circuit 124 generates gate control signals via a plurality of outputs using internal control logic responsive to at least a level of the output voltage VOUT applied from node 116. The duty cycle in the buck mode of operation is defined as $D=t_{on(104)}/T$, where $t_{on(104)}$ is the on-time of switching transistor 104 and T is the switching period of the converter. The switching period T of the converter is defined as the inverse of the switching frequency fsw (e.g., T=1/fsw). On the other hand, during boost operation, the duty cycle is defined to be $D=t_{on(114)}/T$, where $t_{on(114)}$ is the on-time of synchronous high side boost transistor 114 divided by the switching period T of the converter.

Figure 2:
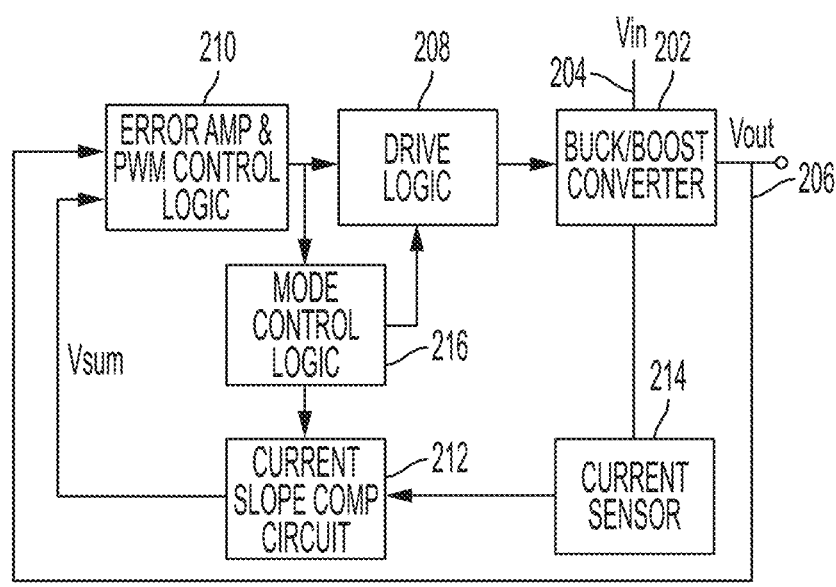
FIG. 2 illustrates a functional block diagram of a buck boost converter, according to some embodiments.

Referring now to FIG. 2, there is illustrated a functional block diagram of a buck boost converter operating according to some embodiments of the present disclosure. The buck boost converter circuitry 202 receives the input voltage VIN at input node 204 and provides the output voltage VOUT at the node 206. Switching transistors within the buck boost converter 202 are driven according to drive control signals provided from drive logic 208. The drive logic 208 generates the drive control signals to the switching transistors responsive to PWM control signals provided from PWM control logic 210. The Error amplifier and PWM control logic 210 generates the PWM control signals responsive to the output voltage monitored at node 206 and also responsive to the output compensated inductor current signal Vsum provided from current slope control compensation logic 212. The current slope control compensation logic generates the Vsum signal to the Error amplifier and PWM control logic 210 responsive to a monitored current within the buck boost converter 202 provided by a current sensor 214 and mode control logic 216. The current sensor 214 measures the input current provided at the input node 204 of the buck boost converter 202. The mode control logic 216 determines whether the buck boost converter 202 is operating in the buck mode of operation, the boost mode of operation, or the buck-boost mode of operation by monitoring the PWM signals provided from the PWM control logic 210. The mode control logic 216 additionally provides mode control signals to the drive logic 208 to control the operation of the switching transistors within the buck boost converter 202.

Figure 3:
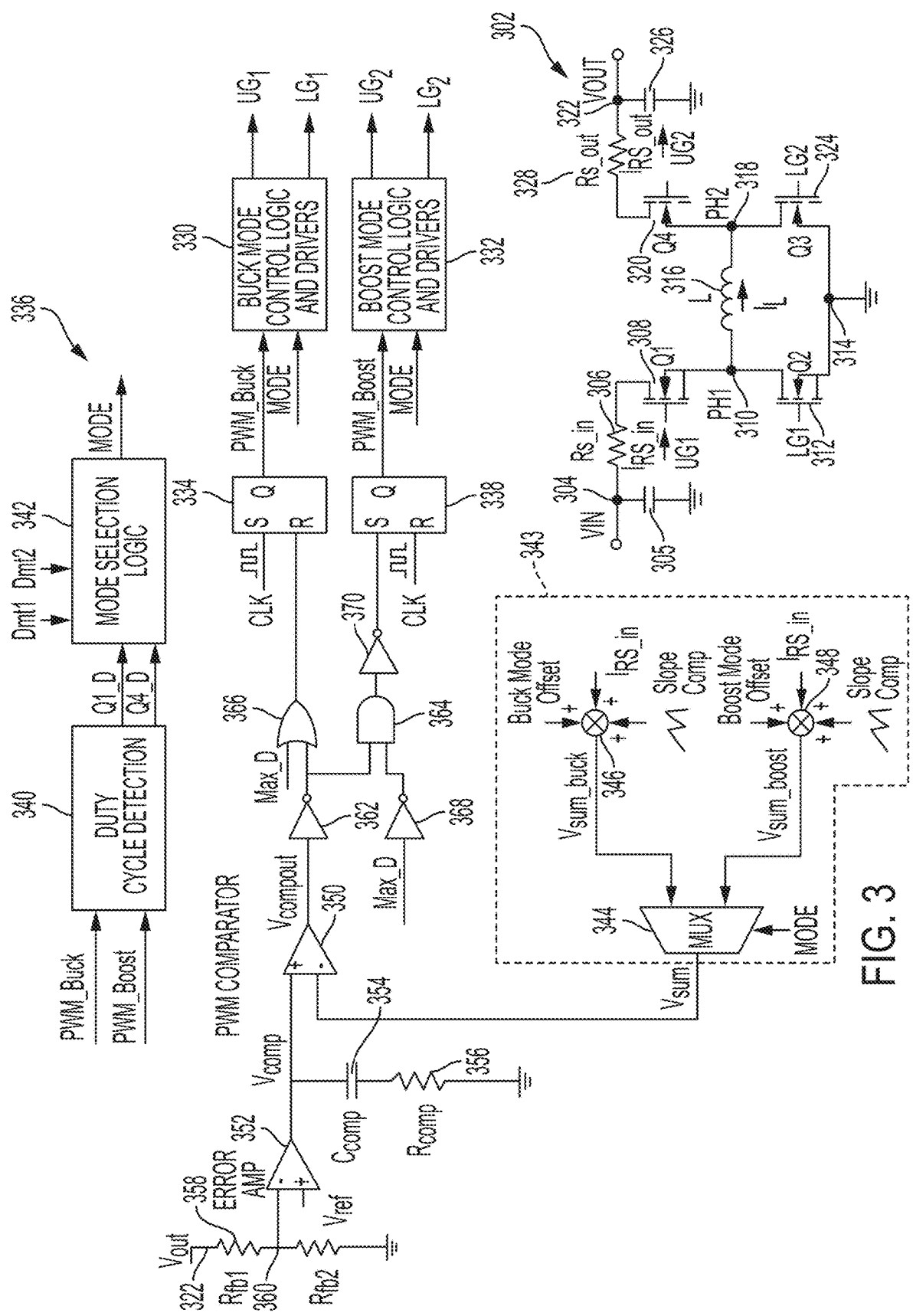
FIG. 3 provides a more detailed block diagram of the buck boost converter shown in FIG. 2, according to some embodiments.

Referring now to FIG. 3, there is illustrated a block diagram of a buck boost converter, according to some embodiments of the present disclosure. The buck boost converter 302 includes an input voltage node 304 to which the input voltage VIN is applied. An input current sensor (e.g., a resistor Rs_in) 306 senses the input voltage current through node 304 and provides a sensed input current $I_{Rs\_in}$. The sensed input current $I_{Rs\_in}$ is the same as the inductor current when an upper buck transistor (Q1) 308 is on. An input capacitor 305 is connected between the input voltage node 304 and ground (or a ground node 314). The upper buck transistor (Q1) 308 is connected between the input current sensor 306 and a node (PH1) 310 to have its drain/source path connected between the input current sensor 306 and the node 310. A gate of the upper buck transistor (Q1) 308 is connected to receive a first upper gate drive signal UG1. A lower buck transistor (Q2) 312 is connected between the node (PH1) 310 and the ground node 314 to have its drain/source path connected between the node 310 and the ground node 314. A gate of the lower buck transistor (Q2) 312 is connected to receive a first lower gate drive signal LG1. An inductor (L) 316 is connected between the node 310 and a node (PH2) 318. In various embodiments, each of the upper buck transistor (Q1) 308 and the lower buck transistor (Q2) 312 may be an N-channel transistor (e.g. N-type power MOSFET), but the present disclosure is not limited thereto, and in other embodiments, each of the upper buck transistor (Q1) 308 and the lower buck transistor (Q2) 312 may be any suitable kind of transistor.

An upper boost transistor (Q4) 320 is connected to the node 318 to have its drain/source path connected between an output current sensor (e.g., a resistor Rs_out) 328 and the node 318. A gate of the upper boost transistor (Q4) 320 is connected to receive a second upper gate drive signal UG2. The output current sensor 328 is connected between the upper boost transistor (Q4) 320 and an output voltage node 322. The output current sensor 328 senses the output voltage current through the node 322 and provides a sensed output current $I_{Rs\_out}$. An output capacitor 326 is connected between the node 322 and ground (or the ground node 314). A lower boost transistor (Q3) 324 is connected to the node 318 to have its drain/source path connected between the node 318 and the ground node 314. A gate of the lower boost transistor (Q3) 324 is connected to receive a second lower gate drive signal LG2. In various embodiments, each of the upper boost transistor (Q4) 320 and the lower boost transistor (Q3) 324 may be an N-channel transistor (e.g. N-type power MOSFET), but the present disclosure is not limited thereto, and in other embodiments, each of the upper boost transistor (Q4) 320 and the lower boost transistor (Q3) 324 may be any suitable kind of transistor.

The gate drive signals UG1, LG1, UG2, and LG2 for each of the upper buck transistor (Q1) 308, the lower buck transistor (Q2) 312, the upper boost transistor (Q4) 320, and the lower boost transistor (Q3) 324 are provided from the buck mode control logic and drivers 330 and the boost mode control logic and drivers 332. The buck mode control logic and drivers 330 generates the first upper gate drive signal UG1 to control the upper buck transistor (Q1) 308 and the first lower gate drive signal LG1 to control the lower buck transistor (Q2) 312 in response to a PWM signal PWM_Buck provided from SR latch 334 and a mode control signal MODE provided from the mode control logic 336. The boost mode control logic and drivers 332 generates the second upper gate drive signal UG2 to control the upper boost transistor (Q4) 320 and the second lower gate drive signal LG2 to control the lower boost transistor (Q3) 324 in response to a PWM control signal PWM_Boost provided from SR latch 338 and the mode control signal MODE provided from the mode control logic 336.

The upper buck transistor (Q1) 308 and the lower buck transistor (Q2) 312 are the power switches for operating the buck boost converter 302 in the buck mode of operation. In the buck mode of operation, the upper boost transistor (Q4) 320 is controlled to maintain a turned on state and the lower boost transistor (Q3) 324 is controlled to maintain a turned off state. Likewise, the upper boost transistor (Q4) 320 and the lower boost transistor (Q3) 324 are the power switches for operating the buck boost converter 302 in the boost mode of operation. In the boost mode of operation, the upper buck transistor (Q1) 308 is controlled to maintain a turned on state and the lower buck transistor (Q2) 312 is controlled to maintain a turned off state. In the buck-boost mode of operation, each of the upper buck transistor (Q1) 308, the lower buck transistor (Q2) 312, the upper boost transistor (Q4) 320, and the lower boost transistor (Q3) 324, are the power switches for operating the buck boost converter 302 in the buck-boost mode of operation.

The SR latch 334 provides the buck PWM signal PWM_Buck from the Q output of the SR latch 334 to the buck mode control logic and drivers 330. The SR latch 334 generates the buck PWM signal PWM_Buck in response to a clock signal provided at the S input of the SR latch 334 and a logic signal applied to the R input of the SR latch 334. The SR latch 338 provides the boost PWM signal PWM_Boost from the Q output of the SR latch 338 to the boost mode control logic and drivers 332. The SR latch 338 generates the boost PWM signal PWM_Boost in response to a clock signal provided at the R input of the SR latch 338 and a logic signal applied to the S input of the SR latch 338.

The mode control logic 336 provides the mode control signal MODE to each of the buck mode control logic and drivers 330 and the boost mode control logic and drivers 332. The mode control logic 336 generates the mode control signal MODE in response to the PWM_Buck and PWM_Boost signals provided from the Q outputs of the SR latches 334 and 338, respectively. In this case, in some embodiments, the mode control logic 336 includes a duty cycle detection circuit 340 and a mode selection logic 342. The duty cycle detection circuit 340 generates a Q1 duty signal Q1_D and a Q4 duty signal Q4_D. The duty cycle detection circuit 340 provides the Q1_D signal and the Q4_D signal to the mode selection logic 342 to generate the mode control signal MODE. In some embodiments, the duty cycle detection circuit 340 generates the Q1_D signal corresponding to the duty of the upper buck transistor (Q1) 308 responsive to the PWM_Buck signal (e.g., Q1_D is equal to the duty cycle of the PWM_Buck signal), and provides the Q1_D signal to the mode selection logic 342. In some embodiments, the duty cycle detection circuit 340 generates the Q4_D signal corresponding to the duty of the upper boost transistor (Q4) 320 responsive to the PWM_Boost signal (e.g., Q4_D is equal to 1 minus the duty cycle of the PWM_Boost signal), and provides the Q4_D signal to the mode selection logic 342.

In some embodiments, the mode selection logic 342 determines whether the buck boost converter 302 operates in (or switches to) either the buck mode of operation, the boost mode of operation, or the buck-boost mode of operation (e.g., a buck cycle and a boost cycle within the buck-boost mode). In some embodiments, the mode selection logic 342 generates the mode control signal MODE to control the operation mode of the buck boost converter 302 responsive to the Q1_D signal and the Q4_D signal. For example, in order to smoothly switch from the buck mode of operation to the buck-boost mode of operation, from the buck-boost mode of operation to the buck mode of operation, from the boost mode of operation to the buck-boost mode of operation, or from the buck-boost mode of operation to the boost mode of operation, the mode selection logic 342 compares the Q1_D signal and the Q4_D signal with one or more transition time duty cycles Dmt (e.g., Dmt1 and Dmt2). In some embodiments, the mode control signal MODE generated by the mode selection logic 342 acts like a multiplexer control signal to select the operational circuits, e.g., current sensing and switch driver control logic depending on whether the converter 302 is in the buck mode of operation, the boost mode of operation, or the buck-boost mode of operation. Thus, the mode control signal MODE selects the buck mode control logic drivers 330, the boost mode control logic and drivers 332, or both (e.g., alternately), depending upon the mode of operation, and also selects an output compensated inductor current signal Vsum provided from the output of an inductor current compensation circuit 343.

For example, in the buck mode of operation, the mode control signal MODE may select the buck mode control logic and drivers 330 to generate the first upper gate drive signal UG1 and the first lower gate drive signal LG1 to switch the upper buck transistor (Q1) 308 and the lower buck transistor (Q2) 312 via PWM switching. Similarly, in the boost mode of operation, the mode control signal MODE may select the boost mode control logic and drivers 332 to generate the second upper gate drive signal UG2 and the second lower gate drive signal LG2 to switch the upper boost transistor (Q4) 320 and the lower boost transistor (Q3) 324 via PWM switching. On the other hand, in the buck-boost mode of operation, the mode control signal MODE may alternately select the buck mode control logic and drivers 330 and the boost mode control logic and drivers 332 to generate the gate drive signals UG1, LG1, UG2, and LG2 to selectively switch the upper buck transistor (Q1) 308, the lower buck transistor (Q2) 312, the upper boost transistor (Q4) 320, and the lower boost transistor (Q3) 324 via 4-switch PWM switching. For example, in the buck-boost mode of operation, the mode control signal MODE may select the buck mode control logic and drivers 330 to perform one cycle of the buck mode operation (e.g., one buck cycle), followed by selecting the boost mode control logic and drivers 332 to perform one cycle of the boost mode operation (e.g., one boost cycle), followed by one cycle of buck mode operation, followed by one cycle of boost mode operation, and so on, until two consecutive boost mode cycles or buck mode cycles are selected.

In some embodiments, the inductor current compensation circuit 343 includes a multiplexer 344, a buck side adder circuit 346, and a boost side adder circuit 348. The multiplexer 344 is connected to receive either a Vsum_buck compensated inductor current signal or a Vsum_boost compensated inductor current signal. The Vsum_buck compensated inductor current signal includes a summation of the sensed current $I_{Rs\_in}$ from the input current sensor 306, a buck mode offset signal, and a buck slope compensation signal, which are added together by the adder circuit 346. In this case, the effective portion of the sensed current $I_{Rs\_in}$ represents the up ramp of the current in inductor 316, which is used for peak current mode control in buck mode implemented by comparator 350. Similarly, the Vsum_boost compensated inductor current signal is generated by the adder circuit 348 by summing together the sensed current $I_{Rs\_in}$ from the input current sensor 306, a boost mode offset signal, and a boost slope compensation signal. The effective portion of the sensed current $I_{Rs\_in}$ represents the down ramp of the current in inductor 316, which is used for valley current mode control in boost mode implemented by comparator 350. The sensed current $I_{Rs\_in}$ from the input current sensor 306 is summed with the buck mode offset or the boost mode offset to ensure that error amplifier 352 is operating with a proper DC bias. The buck or boost compensation slope is added to the sensed current $I_{Rs\_in}$ to avoid subharmonic oscillation in large duty cycle operations. While FIG. 3 shows that the Vsum_buck compensated inductor current signal and the Vsum_boost compensated inductor current signal are generated by adding the sensed current $I_{Rs\_in}$ from the input current sensor 306 by the adder circuits 346 and 348, respectively, the present disclosure is not limited thereto. For example, in other embodiments, at least one of the Vsum_buck compensated inductor current signal and the Vsum_boost compensated inductor current signal may be generated by adding the sensed current $I_{Rs\_out}$ from the output current sensor 328.

In some embodiments, each of the Vsum_buck and Vsum_boost compensated inductor current signals are provided to an input of the multiplexer 344. Depending on whether the buck boost converter 302 is operating in the buck mode of operation, the boost mode of operation, or the buck-boost mode of operation, either the Vsum_buck (buck mode) or the Vsum_boost (boost mode) are selected responsive to the MODE signal at the multiplexer 344, and the selected signal is provided as an output compensated inductor current signal Vsum. In some embodiments, in the buck-boost mode of operation, the Vsum_buck compensated inductor current signal and the Vsum_boost compensated inductor current signal are alternately provided as the output compensated inductor current signal Vsum responsive to the MODE signal at the multiplexer 344.

In some embodiments, the output compensated inductor current signal Vsum is provided to an inverting input of a PWM comparator 350 from the multiplexer 344. A non-inverting input of the PWM comparator 350 is connected to receive a voltage error signal VCOMP from an error amplifier 352. An output of the error amplifier 352 is connected to ground through a capacitor (Ccomp) 354 in series with a resistor (Rcomp) 356. An inverting input of the error amplifier 352 monitors the output voltage VOUT at node 322 through a resistor divider including a resistor (Rfb1) 358 connected between the output node 322 and a node 360, and a resistor Rfb2 connected between the node 360 and ground. The inverting input of error amplifier 352 is connected to the node 360. A reference voltage VREF is applied to a non-inverting input of the error amplifier 352. The error amplifier 352 compares the reference voltage VREF with the output voltage VOUT from the buck boost converter 302 to generate the voltage error signal VCOMP. The voltage error signal VCOMP is used to determine an inductor current $I_L$ through the inductor 316 in a peak current mode when the buck boost converter 302 is operating in the buck mode of operation, a valley current mode when the buck boost converter 302 is operating in the boost mode of operation, and a one cycle peak current mode buck followed by one cycle valley current mode boost alternating operation mode when the buck boost converter 302 is operating in the buck-boost mode of operation. Buck operation and boost operation share the same voltage error signal VCOMP. The comparison of Vsum from the output of multiplexer 344 with the voltage error signal VCOMP determines the duty cycle of the PWM_Buck and PWM_Boost signals, and thus, the on/off state of the transistors 308, 312, 320, and 324.

An output VCOMPOUT of the PWM comparator 350 is provided as an input to an inverter 362. The output of the inverter 362 is provided to a first input of an OR gate 366 and to a first input of an AND gate 364. The other input of the OR gate 366 is connected to receive a maximum duty signal MAX_D. In some embodiments, the MAX_D signal may be a fixed signal that is used to remove narrow positive and negative pulses in the output of the inverter 362. The output of the OR gate 366 provides the logic signal to the R input of the SR latch 334 to enable the generation of the PWM_Buck signal. The other input of the AND gate 364 is connected to an output of an inverter 368. The input of the inverter 368 is connected to receive the MAX_D signal. The output of the AND gate 364 is connected to another inverter 370. The output of the inverter 370 provides the logic signal to the S input of the SR latch 338 to enable the generation of the PWM_Boost signal.

Referring now to FIGS. 4A-4C, waveform diagrams are shown for driving the buck boost converter 302 of FIG. 3 in various modes, according to some embodiments. More specifically, FIG. 4A shows a waveform diagram for driving the buck boost converter 302 in the buck mode, FIG. 4B shows a waveform diagram for driving the buck boost converter 302 in the boost mode, and FIG. 4C shows a waveform diagram for driving the buck boost converter 302 in the buck-boost mode.

Referring to FIG. 4A, in the buck mode, the upper boost transistor (Q4) 320 receives the second upper gate drive signal UG2 having a level (e.g., an on level) that is sufficient to maintain the upper boost transistor (Q4) 320 in an on state, and the lower boost transistor (Q3) 324 receives the second lower gate drive signal LG2 having a level (e.g., an off level) that is sufficient to maintain the lower boost transistor (Q3) 324 in an off state. In the buck mode, the output voltage VOUT is controlled (e.g., bucked) by alternately switching on and off the upper buck transistor (Q1) 308 and the lower buck transistor (Q2) 312 via PWM switching. Thus, in the buck mode, the upper buck transistor (Q1) 308 is alternately switched on and off via the first upper gate drive signal UG1, and the lower buck transistor (Q2) 312 is alternately switched on and off via the first lower gate drive signal LG1. The first upper gate drive signal UG1 and the first lower gate drive signal LG1 are provided by the buck mode control logic and drivers 330 in response to the mode control signal MODE and the PWM_Buck signal. In some embodiments, when the on time of the lower buck transistor (Q2) 312 or the off time of the upper buck transistor (Q1) 308 is greater than a transition time Tmt, or when the duty cycle Q1_D of the upper buck transistor (Q1) 308 is less than the one or more transition time duty cycles Dint, the buck boost converter 302 operates (or remains) in the buck mode in the next cycle.

Referring to FIG. 4B, in the boost mode, the upper buck transistor (Q1) 308 receives the first upper gate drive signal UG1 having a level (e.g., an on level) that is sufficient to maintain the upper buck transistor (Q1) 308 in an on state, and the lower buck transistor (Q2) 312 receives the first lower gate drive signal LG1 having a level (e.g., an off level) that is sufficient to maintain the lower buck transistor (Q2) 312 in an off state. In the boost mode, the output voltage VOUT is controlled (e.g., boosted) by alternately switching on and off the upper boost transistor (Q4) 320 and the lower boost transistor (Q3) 324 via PWM switching. Thus, in the boost mode, the upper boost transistor (Q4) 320 is alternately switched on and off via the second upper gate drive signal UG2, and the lower boost transistor (Q3) 324 is alternately switched on and off via the second lower gate drive signal LG2. The second upper gate drive signal UG2 and the second lower gate drive signal LG2 are provided by the boost mode control logic and driver 332 in response to the mode control signal MODE and the PWM_Boost signal. In some embodiments, when the on time of the lower boost transistor (Q3) 32.4 or the off time of the upper boost transistor (Q4) 320 is greater than the transition time Tmt, or when the duty cycle Q4_D of the upper boost transistor (Q4) 320 is less than the one or more transition time duty cycles Dmt, the buck boost converter 302 operates (or remains) in the boost mode in the next cycle.

Referring to FIG. 4C, in the buck-boost mode, each of the upper buck transistor (Q1) 308, the lower buck transistor (Q2) 312, the upper boost transistor (Q4) 320, and the lower boost transistor (Q3) 324 are switched on and off via 4-switch PWM switching. Thus, the upper buck transistor (Q1) 308 is alternately switched on and off via the first upper gate drive signal UG1, and the lower buck transistor (Q2) 312 is alternately switched on and off via the first lower gate drive signal LG1, which are provided by the buck mode control logic and drivers 330 responsive to the mode control signal MODE and the PWM_Buck signal. Similarly, the upper boost transistor (Q4) 320 is alternately switched on and off via the second upper gate drive signal UG2 and the lower boost transistor (Q3) 324 is alternately switched on and off via the second lower gate drive signal LG2, which are provided by the boost mode control logic and drivers 332 responsive to the mode control signal MODE and the PWM_Boost signal.

In some embodiments, when the on time of the lower boost transistor (Q3) 324 or the off time of the upper boost transistor (Q4) 320 is less than the transition time Tint, or when the duty cycle Q4_D of the upper boost transistor (Q4) 320 is greater than the one or more transition time duty cycles Dmt (e.g., Dmt1 or Dmt2), the buck boost converter 302 operates in (or switches to) the buck mode in the next cycle. On the other hand, in some embodiments, when the on time of the lower buck transistor (Q2) 312 or the off time of the upper buck transistor (Q1) 308 is less than the transition time Tmt, or when the duty cycle Q1_D of the upper buck transistor (Q1) 308 is greater than the one or more transition time duty cycles Dmt, the buck boost converter 302 operates in (or switches to) the boost mode in the next cycle. In some embodiments, in the buck-boost mode, the buck boost converter 302 alternately operates in one buck cycle (or boost cycle) followed by one boost cycle (or buck cycle), and so on, until 2 consecutive buck cycles or boost cycles appear, in which case the buck boost converter 302 exits the buck-boost mode.

In some embodiments, the one or more transition time duty cycles Dmt may include a first transition time duty cycle Dmt1 and a second transition time duty cycle Dmt2. In some embodiments, the first transition time duty cycle Dmt1 sets an enter duty threshold of the buck-boost mode, and may be close to (e.g., equal to or substantially equal to) the maximum duty signal Max_D. In this case, in some embodiments, the maximum duty signal Max_D is determined by the minimum off time Tmin_off of Q1 or Q4. That is, in some embodiments, Max_D=1−Tmin_off/T, where T is the switching period determined by the clock signal CLK shown in FIG. 3. The minimum off time Tmin_off of Q1 or Q4 may be used to ensure the safe operation of the control logic and drivers 330 and 332. Accordingly, the first transition time duty cycle Dmt1 may be set to be slightly less than Max_D (e.g., Dmt1=98% of Max_D). In some embodiments, the second transition time duty cycle Dmt2 sets an exit duty threshold of the buck-boost mode, and may be less than the first transition time duty cycle Dmt1. For example, the second transition time duty cycle Dmt2 may be set to 70% of the first transition time duty cycle Dmt1, but the present disclosure is not limited thereto.

Figure 5:
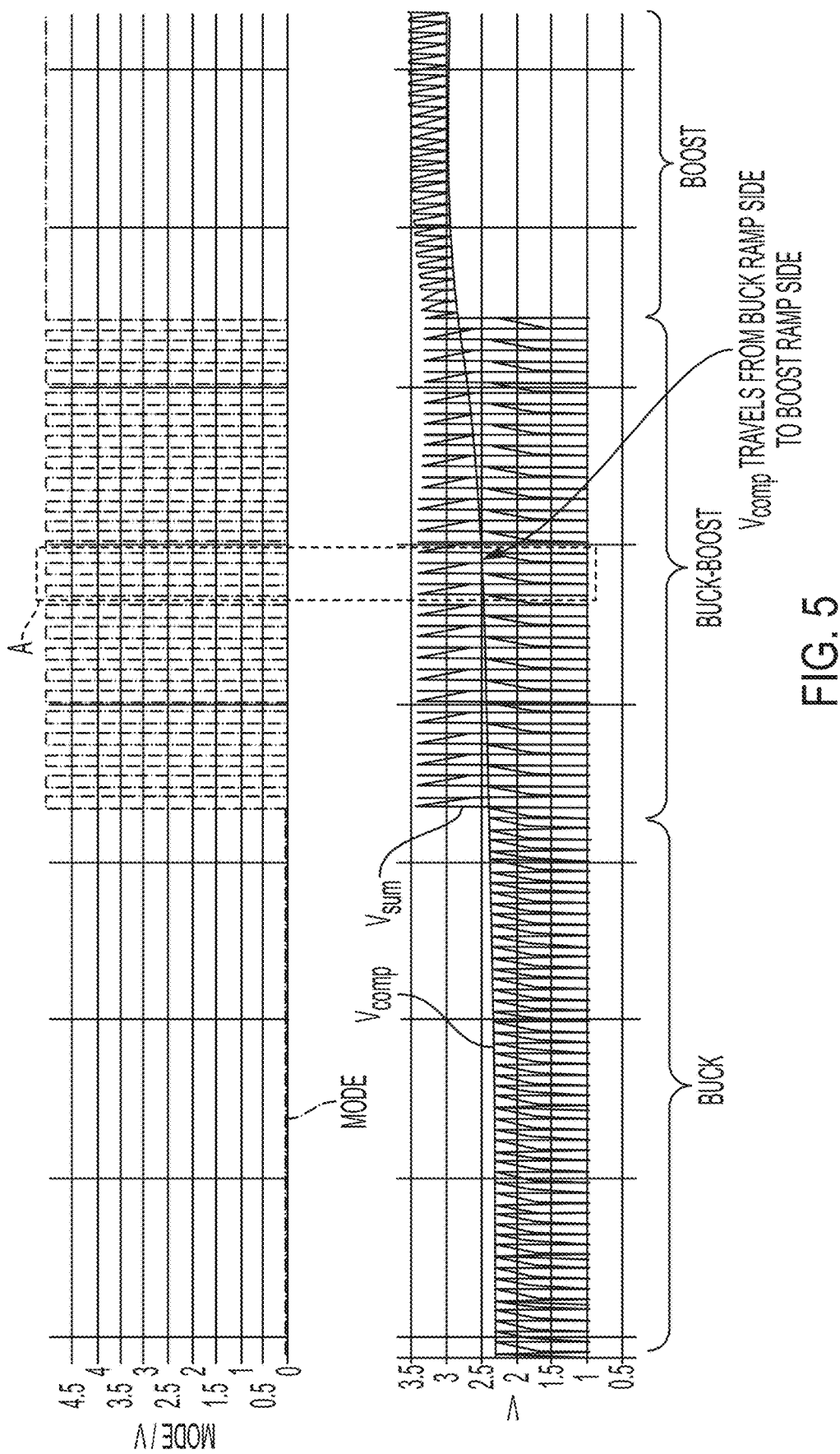
FIG. 5 illustrates a waveform corresponding to mode transition control based on a mode control signal, according to some embodiments.

Accordingly, in some embodiments, when the converter 302 is operating in the buck mode or the boost mode, the respective duty cycles Q1_D and Q4_D may be compared with the first transition time duty cycle Dmt1 to determine if the converter 302 should transition to (or enter) the buck-boost mode. On the other hand, when the converter 302 is operating in the buck-boost mode, the duty cycles Q1_D and Q4_D may be compared with the second transition time duty cycle Dmt2 to determine if the converter 302 should exit the buck-boost mode and transition to the buck mode or the boost mode as the case may be. For example, when operating in the buck mode or boost mode, the respective duty cycles Q1_D or Q4_D are compared with the first transition time duty cycle Dmt1, and if the respective duty cycles Q1_D and Q4_D are greater than the first transition time duty cycle Dmt1, the converter 302 transitions (or switches) to the buck-boost mode of operation (e.g., one cycle buck (or boost) followed by one cycle boost (or buck)). On the other hand, when operating in the buck-boost mode of operation (e.g., one cycle buck (or boost) followed by one cycle boost (or buck)), the duty cycles Q1_D and Q4_D are compared with the second transition time duty cycle Dmt2. If the duty cycles Q1_D and Q4_D are greater than the second transition time duty cycle Dmt2, the converter 302 remains in the buck-boost mode of operation (e.g., one cycle buck (or boost) followed by one cycle boost (or buck)). On the other hand, if one of the duty cycles Q1_D and Q4_D becomes less than (or not greater than) the second transition time duty cycle Dmt2, the converter 302 exits the buck-boost mode of operation and transitions to a buck mode or boost mode of operation as the case may be Referring now to FIG. 5, a waveform is shown corresponding to a simulation result of controlling mode transitions based on the mode control signal MODE, according to some embodiments. As shown in FIG. 5, a mode control signal MODE is generated to control mode transitions from a buck mode to a buck-boost mode, and from the buck-boost mode to a boost mode. FIG. 5 also shows the corresponding error signal VCOMP generated from the error amplifier 352 and the corresponding output compensated inductor current signal Vsum generated from the multiplexer 344 of the inductor current compensation circuit 343 as a result of each of the mode transitions.

Referring to FIGS. 3, 4A, and 5, in some embodiments, when the mode selection logic 342 generates the mode selection signal MODE having a logic "low" level (e.g., 0V), the converter 302 operates in the buck mode. In response to the mode selection signal MODE indicating the buck mode operation, the buck mode control logic and drivers 330 is selected to generate the first upper gate drive signal UG1 and the first lower gate drive signal LG1 to alternately switch on and off the upper buck transistor (Q1) 308 and the lower buck transistor (Q2) 312 according to the PWM_Buck signal. Further, in response to the mode selection signal MODE indicating the buck mode of operation, the boost mode control logic and drivers 332 concurrently (e.g., simultaneously) generates the second upper gate drive signal UG2 having a level sufficient to maintain the upper boost transistor (Q4) 320 in an on state, and the second lower gate drive signal LG2 having a level sufficient to maintain the lower boost transistor (Q3) 324 in an off state.

While operating in the buck mode, the mode selection logic 342 monitors the duty cycle signal Q1_D to determine if the Q1_D signal is greater than the first transition time duty cycle Dmt1. If the Q1_D signal is less than (or not greater than) the first transition time duty cycle Dmt1, then the mode selection logic 342 continues to generate the mode selection signal MODE at the logic "low" level so that the converter 302 maintains the buck mode of operation for the next cycle. On the other hand, when the mode selection logic 342 determines that the Q1_D signal is greater than the first transition time duty cycle Dmt1, the mode selection logic 342 generates the mode control signal MODE to have a logic "high" level (e.g., 5V) so that the converter 302 transitions to a buck-boost mode (e.g., a boost cycle within the buck-boost mode).

Initially, when operating in the buck mode with a higher input voltage VIN, the duty cycle Q1_D of the upper buck transistor (Q1) 308 is lower than the first transition time duty cycle Dmt1, since Q1_D=VOUT/VIN. As the input voltage VIN decreases to a level close to the output voltage VOUT, the duty cycle Q1_D of the upper boost transistor (Q1) 308 increases until Q1_D is greater than the first transition time duty cycle Dmt1.

In response to the duty cycle Q1_D being greater than the first transition time duty cycle Dmt1, the mode selection logic 342 generates the mode control signal MODE to switch the operation mode to a boost cycle within a buck-boost mode. When initially transitioning to the buck-boost mode from the buck mode, the input voltage VIN is still relatively close to the output voltage VOUT, and thus, the duty cycles Q1_D and Q4_D of the upper buck transistor (Q1) 308 and the upper boost transistor (Q4) 320 are greater than the second transition time duty cycle Dmt2 (where Dmt2<Dmt1). Thus, after one boost cycle of the buck-boost mode is performed, the mode selection logic 342 generates the mode control signal MODE to switch the operation mode to a buck cycle of the buck-boost mode, since Q4_D is greater than the second transition time duty cycle Dmt2. The mode selection logic 342 generates the mode control signal MODE to alternately switch the operation mode between one boost cycle and one buck cycle (and thus, 4-switch PWM switching), until one of the duty cycles Q1_D and Q4_D of the upper buck transistor (Q1) 308 and the upper boost transistor (Q4) 320 become less than the second transition time duty cycle Dmt2. For example, as shown in FIG. 5, after some time switching between one boost cycle and one buck cycle, the duty cycle Q4_D becomes less than the second transition time duty cycle Dmt2. Thus, in response, the mode selection logic 342 generates the mode control signal MODE having the logic "high" level to switch the operation mode to the boost mode.

When operating in the boost mode, the boost mode control logic and drivers 332 is selected to generate the second upper gate drive signal UG2 and the second lower gate drive signal LG2 to alternately switch on and off the upper boost transistor (Q4) 320 and the lower boost transistor (Q3) 324 according to the PWM_Boost signal. Further, in response to the mode selection signal MODE indicating the boost mode of operation, the buck mode control logic and drivers 330 concurrently (e.g., simultaneously) generates the first upper gate drive signal UG1 having a level sufficient to maintain the upper buck transistor (Q1) 308 in an on state, and the first lower gate drive signal LG1 having a level sufficient to maintain the lower buck transistor (Q2) 312 in an off state. While operating in the boost mode, the mode selection logic 342 monitors the duty cycle signal Q4_D to determine if the Q4_D signal is greater than the first transition time duty cycle Dmt1.

Still referring to FIG. 5, in the buck mode, the output compensated inductor current signal Vsum generated by the multiplexer 344 remains below the voltage error signal VCOMP generated by the error amplifier 352. As the voltage error signal VCOMP increases, the duty cycle signal Q1_D increases to a level greater than the first transition time duty cycle Dmt1, and thus, the operation mode transitions to the buck-boost mode. In the buck-boost mode, the voltage error signal VCOMP continues to increase until the duty cycle signal Q4_D decreases to less than the second transition time duty cycle Dmt2, and thus, the operation mode is transitioned to the boost mode. In the boost mode, the output compensated inductor current signal Vsum remains above the voltage error signal VCOMP.

Figure 6:
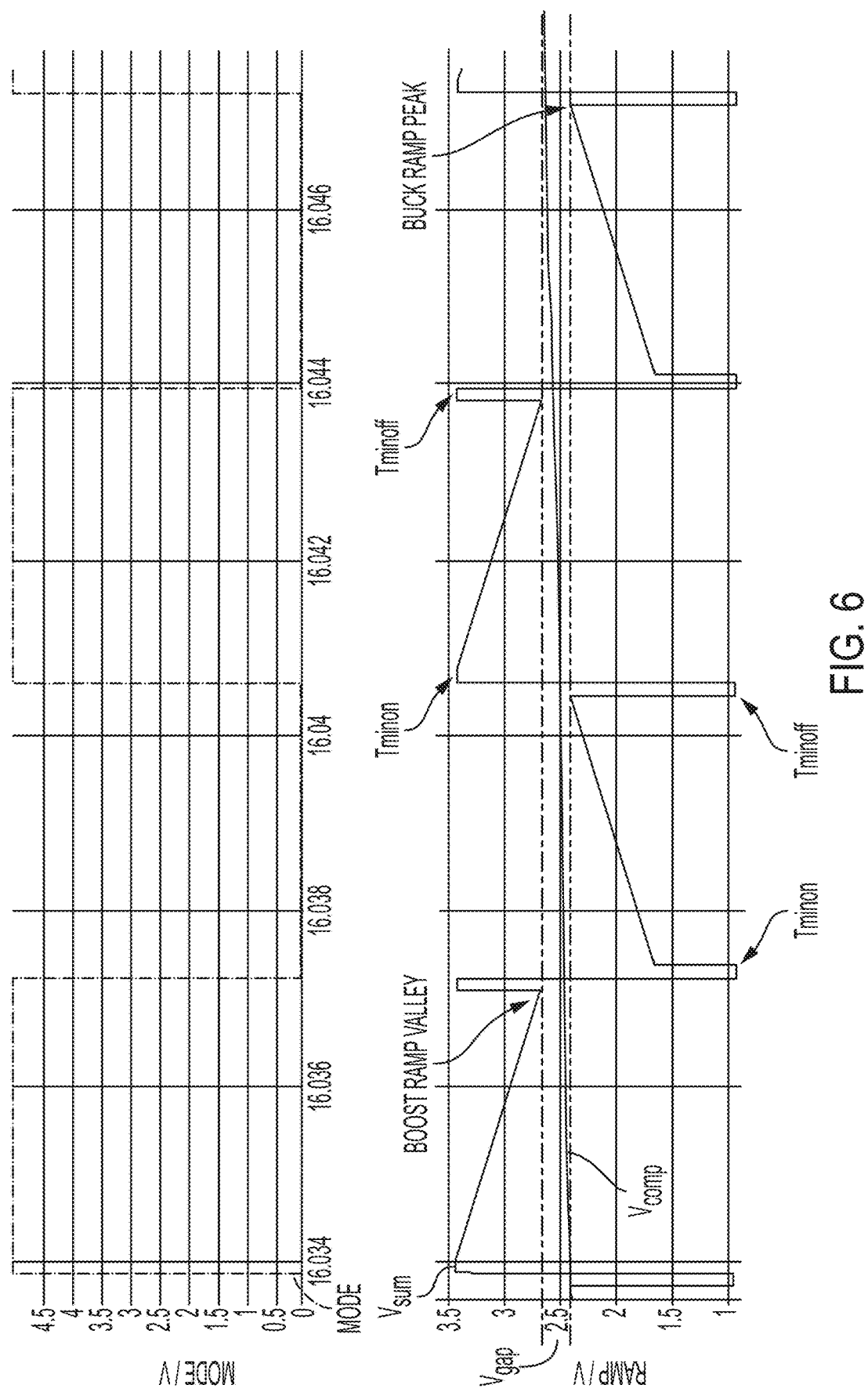
FIG. 6 illustrates the enlarged portion A of the waveform of FIG. 5.

In the buck-boost mode, as the voltage error signal VCOMP increases, VCOMP travels from a buck ramp side to a boost ramp side (or from a boost ramp side to a buck ramp side as VCOMP decreases in the case of transitioning from boost to buck-boost to buck modes) of the output compensated inductor current signal Vsum. Thus, the voltage error signal VCOMP travels through a Vgap between a buck ramp peak and a boost ramp valley of the output compensated inductor current signal Vsum in order to move from the buck ramp side to the boost ramp side (or from the boost ramp side to the buck ramp side). For example, referring to FIG. 6, the enlarged portion A of the waveform of FIG. 5 is shown. As shown in FIG. 6, as the mode signal MODE alternates between a boost cycle and a buck cycle in the buck-boost mode, a Vgap is generated between the boost ramp valleys and buck ramp peaks of the output compensated inductor current signal Vsum. As the voltage error signal VCOMP travels from the buck ramp side to the boost ramp side, the voltage error signal VCOMP travels through the Vgap area. In the Vgap area, the buck cycle runs in maximum duty (e.g., duty of the PWM_Buck signal) and the boost cycle runs in minimum duty (e.g., duty of the PWM_Boost signal). Thus, as the input voltage VIN changes, the output voltage VOUT generally follows the input voltage VIN, which can lead to a poor line transient. Further, the Vgap can proportionally increase with the switching frequency Fsw, which can exacerbate the problem of poor line transient response in applications that require higher switching frequencies.

Figure 7:
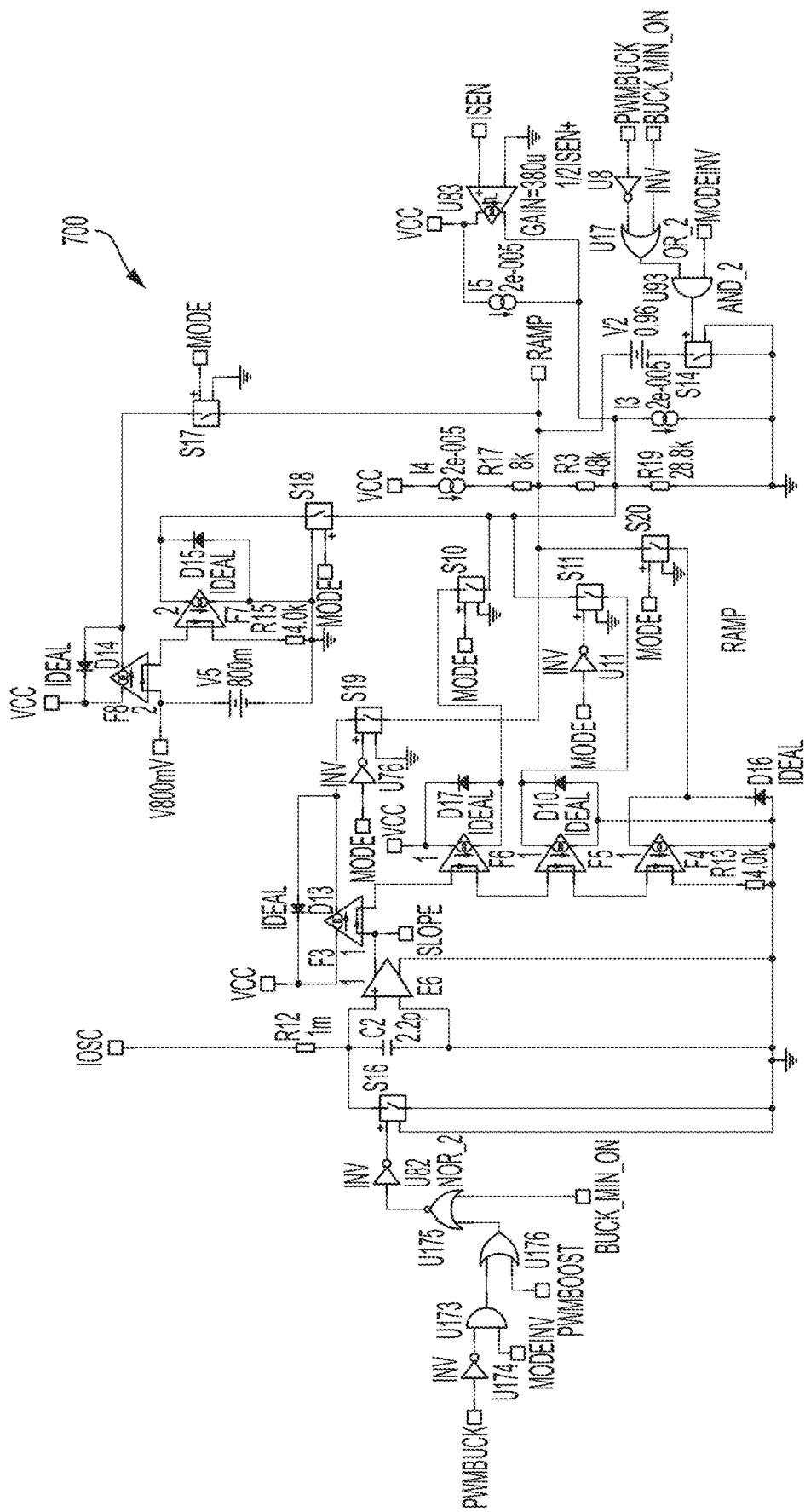
FIG. 7 illustrates a circuit diagram of an inductor current compensation circuit.

For example, referring to FIG. 7, a circuit diagram of an inductor current compensation circuit 700 is shown. The inductor current compensation circuit 700 may be similar to the inductor current compensation circuit 343 of FIG. 3, except the inductor current compensation circuit 700 does not include a boost ramp offset compensation circuit 902 (which will be described below with reference to FIG. 9). As shown in FIG. 7, the inductor current is represented by the ISEN signal. In this case, the inductor current compensation circuit 700 generates a Vgap in the output compensated inductor current signal V sum that proportionally increases with the switching frequency Fsw. For example, referring to FIG. 7, Iosc is a current source proportional to the switching frequency Fsw, and may be defined as Iosc=Kosc×Fsw, where Kosc is a gain constant (e.g., Kosc=1.5×10$^{-12}$ (Second×Ampere). The switching period T is the inverse of the switching frequency Fsw, and is defined as T=1/Fsw. Tminon and Tminoff are the minimum on and off times of the boost ramp valley and buck ram peak as shown in FIG. 6, and are assumed to be the same for both the buck and boost cycles. Tminnf is the total minimum on and off times, and is defined as Tminnf=Tminon+Tminoff. In the non-limiting example of FIG. 7, I4=I3 (e.g., 20 uA), R13=R15 (e.g., 40 k), and a voltage reference V5=800 mV.

Assuming the converter 302 runs in no load condition and ignoring the inductor current slope as in buck-boost mode, Vin is close to Vout and the inductor current slope is close to 0. Thus, the maximum buck ramp peak Vramp_buck_max generated by the inductor current compensation circuit 700 is defined in equation 1:

$$\text{Vramp\_buck\_max} = I4R3 + \frac{Iosc(T - Tminnf)R3}{C2R13} \qquad (1)$$

The minimum boost ramp valley Vramp_boost_min generated by the inductor current compensation circuit 700 is defined in equation 2:

$$\text{Vramp\_boost\_min} = \left(I4 + \frac{2V5}{R15}\right)R3 - \frac{Iosc(T - Tminnf)R3}{C2R13} \qquad (2)$$

The Vgap generated by the inductor current compensation circuit 700 is defined as Vgap=Vramp_boost_min−Vramp_buck_max, which results in equation 3:

$$Vgap = \frac{2R3\left(V5 - \frac{Kosc}{C2} + \frac{Kosc \times Fsw \times Tminnf}{C2}\right)}{R13} \quad (3)$$

Figure 8A:
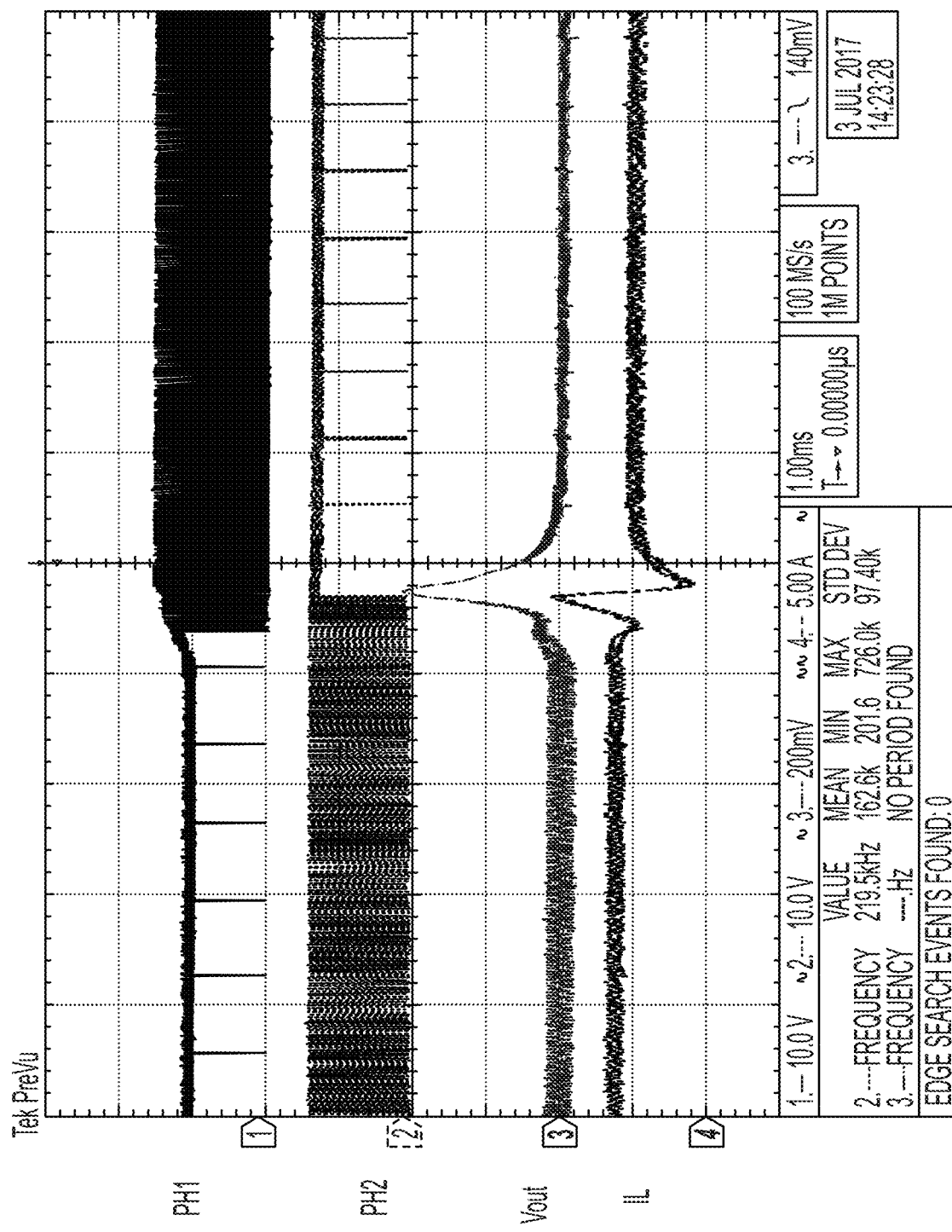
FIGS. 8A and 8B illustrate various waveforms generated during mode transitions utilizing the inductor current compensation circuit of FIG. 7.
Figure 8B:
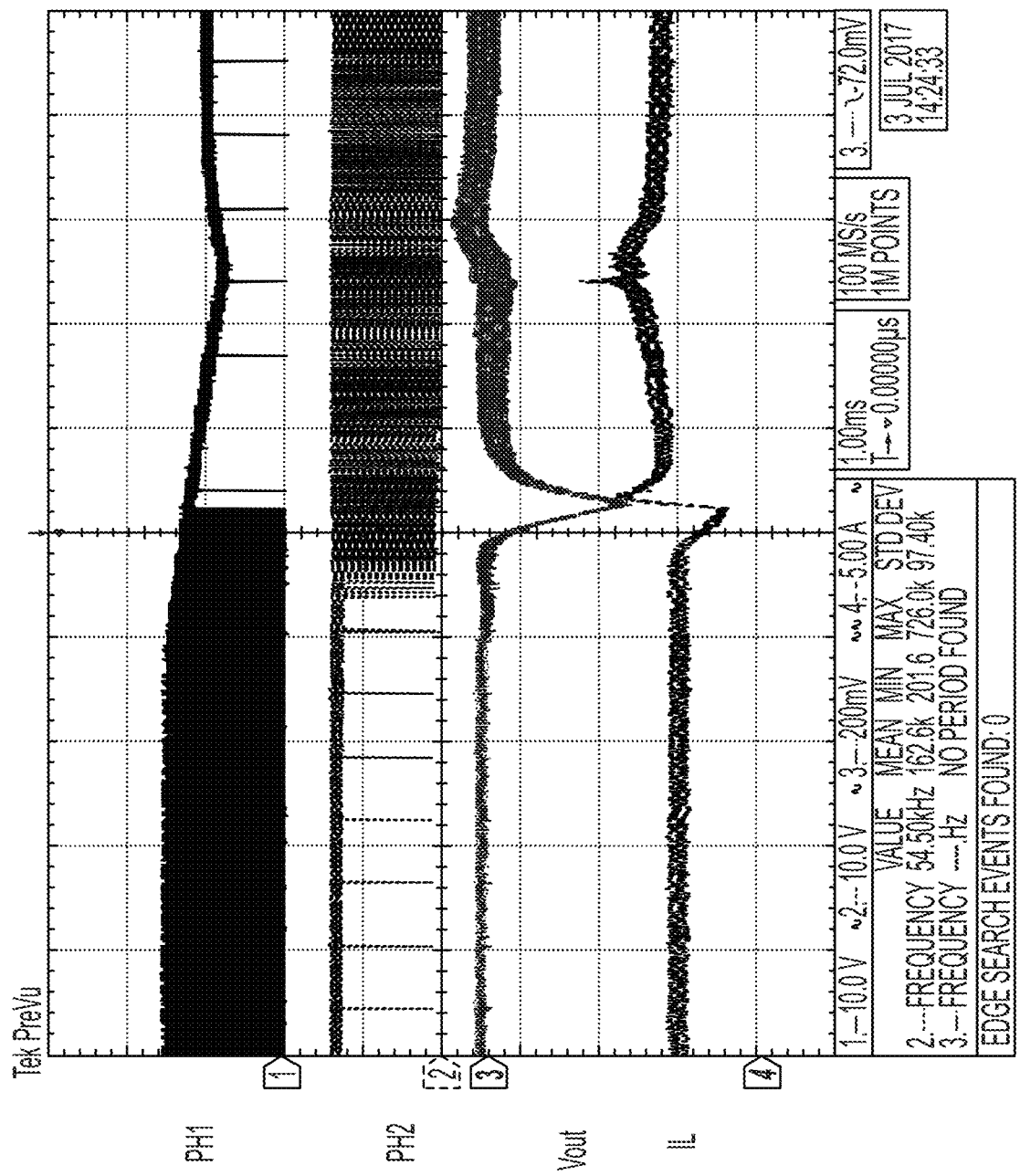

As shown in equation 3, the Vgap of the output compensated inductor current signal Vsum generated by the inductor current compensation circuit 700 increases proportionally as the switching frequency Fsw increases. Thus, for applications requiring higher switching frequencies Fsw, line transient response may be degraded, resulting in degraded performance of the converter 302. For example, referring to FIGS. 8A and 8B, various waveforms generated during mode transitions utilizing the output compensated inductor current signal Vsum generated by the inductor current compensation circuit 700 are shown. The waveforms of FIGS. 8A and 8B include a node voltage at the node (PH1) 310, a node voltage at the node (PH2) 318, the output voltage VOUT, and the inductor current $I_L$ across the inductor (L) 316. As shown in FIGS. 8A and 8B, when operating in the buck-boost mode, line transients are generated in the output voltage VOUT and the inductor current $I_L$ as the voltage error signal VCOMP traverses the Vgap area of the output compensated inductor current signal Vsum generated by the inductor current compensation circuit 700. If the Vgap area increases proportionally to an increase in the switching frequency Fsw, line transient response is degraded as the voltage error signal VCOMP traverses through a larger Vgap area.

According to one or more example embodiments, the Vgap is adjusted based on switching frequency Fsw, so that the Vgap area remains relatively fixed irrespective of the switching frequency Fsw. For example, in some embodiments, a boost ramp offset compensation circuit 902 is included in the inductor current compensation circuit 343 to compensate for the variation in the Vgap attributed to a change in the switching frequency Fsw. For example, referring now to FIG. 9, a circuit diagram of the inductor current compensation circuit 343 is shown, according to some embodiments. In some embodiments, the inductor current compensation circuit 343 may be the same as or similar to the inductor current compensation circuit 343 of FIG. 3. In some embodiments, the inductor current compensation circuit 343 includes the boost ramp offset compensation circuit 902 to adjust a boost side clamp voltage in response to an input from the current source Iosc. The current source Iosc generates a current proportional to the switching frequency Fsw. Accordingly, even if the switching frequency Fsw is changed, the Vgap generated by the inductor current compensation circuit 343 remains fixed or substantially fixed irrespective of the switching frequency Fsw. Thus, line transient response may be improved.

Figure 9:
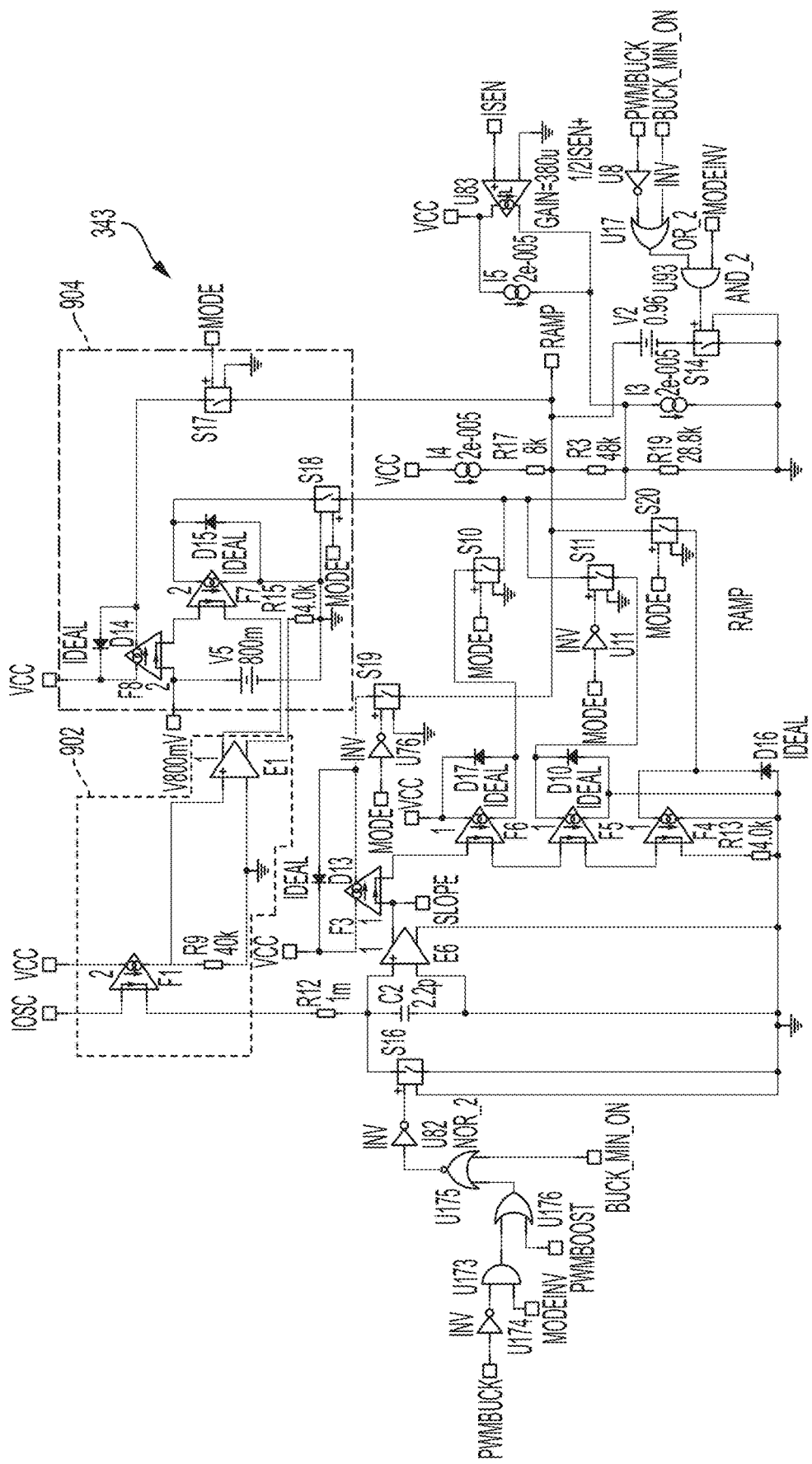
FIG. 9 illustrates a circuit diagram of an inductor current compensation circuit, according to some embodiments.

Referring to FIG. 9, in some embodiments, the boost ramp offset compensation circuit 902 includes a current mirror F1 (e.g., a 2× current mirror), a resistor R9, and an amplifier E1 (e.g., an amplifier with 1 gain). In some embodiments, the current mirror F1 is connected between the current source Iosc and resistor R12. The current mirror F1 mirrors the current proportional to the switching frequency Fsw generated by the current source Iosc, and applies the mirrored current proportional to the switching frequency Fsw to a node N1. The node N1 is connected between a power source VCC and the resistor R9. The resistor R9 is connected between the node N1 and ground. The resistor R9 generates a boost side adjustment voltage corresponding to the mirrored current at the node N1. A non-inverting input terminal of the amplifier E1 is connected to the node N1, and another input terminal of the amplifier E1 is connected to ground. The amplifier E1 generates the boost ramp offset compensation voltage corresponding to the boost side adjustment voltage and applies the boost ramp offset compensation voltage to a boost ramp offset generation circuit 904. The boost ramp offset generation circuit 904 uses the boost ramp offset compensation voltage to generate an adjusted boost ramp offset signal to compensate for variations in the switching frequency Fsw so that a fixed or substantially fixed Vgap is generated irrespective of the switching frequency Fsw.

Accordingly, referring to equation 3, the Vgap generated by the inductor current compensation circuit 343 including the boost ramp offset compensation circuit 902 as shown in FIG. 9 results in equation 4:

$$Vgap = \frac{2R3}{R13}\left(V5 - Kosc \times Fsw \times F1 \times R9 \times E1 - \frac{Kosc}{C2} + \frac{Kosc \times Fsw \times Tminnf}{C2}\right) \quad (4)$$

By selecting the parameters of the current mirror F1, the resistor R9, and the amplifier E1 to correspond proportionally to Tminnf so that F1×R9×E1=Tminnf/C2, equation 4 results in equation 5:

$$Vgap = \frac{2R3}{R13}\left(V5 - \frac{Kosc}{C2}\right) \quad (5)$$

Figure 10A:
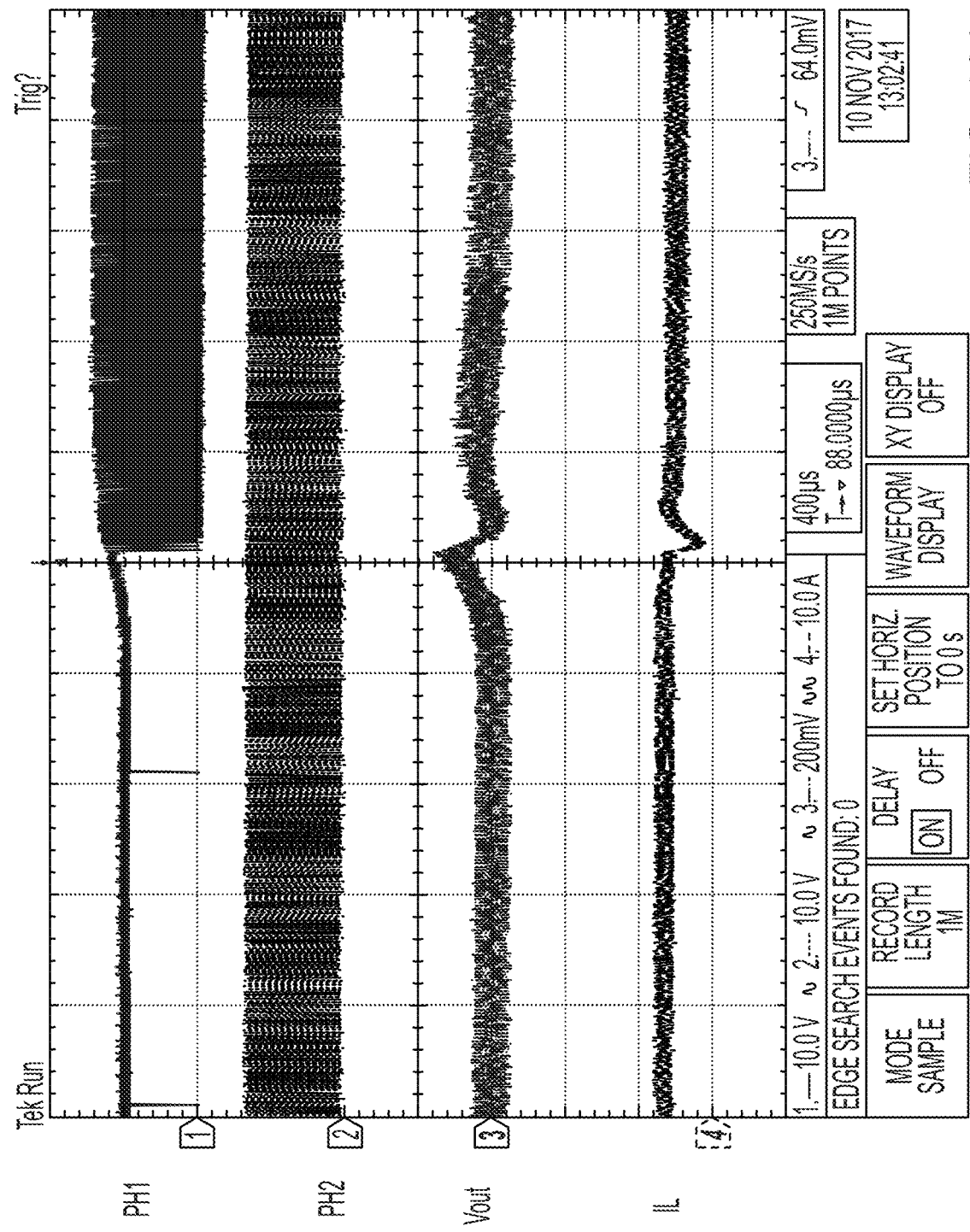
FIGS. 10A and 10B illustrate various waveforms generated during mode transitions utilizing the inductor current compensation circuit of FIG. 9, according to some embodiments.
Figure 10B:
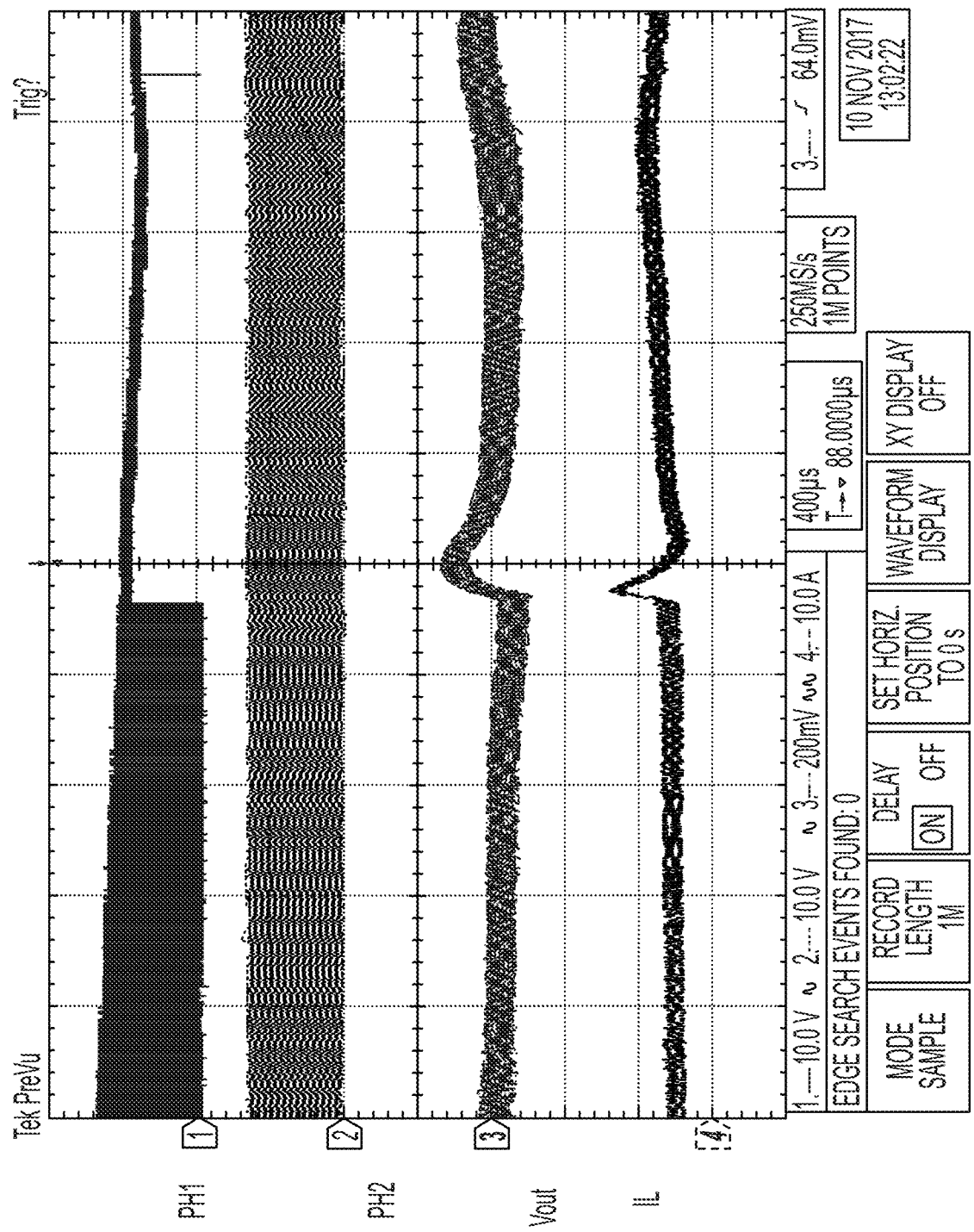

Accordingly, as shown in equation 5, the Vgap generated by the inductor current compensation circuit 343 including the boost ramp offset compensation circuit 902 does not depend on the switching frequency Fsw, and instead, is adjusted based on the switching frequency Fsw to remain relatively fixed. Accordingly, line transient response may be improved irrespective of the switching frequency Fsw. For example, referring to FIGS. 10A and 10B, various waveforms generated during mode transitions utilizing the output compensated inductor current signal Vsum generated by the inductor current compensation circuit 343 including the boost ramp offset compensation circuit 902 are shown. The waveforms of FIGS. 10A and 10B include a node voltage at the node (PH1) 310, a node voltage at the node (PH2) 318, the output voltage VOUT, and the inductor current $I_L$ across the inductor (L) 316. As shown in FIGS. 10A and 10B, when operating in the buck-boost mode, line transients generated in the output voltage VOUT and the inductor current $I_L$ are improved. Further, since the Vgap area is adjusted relative to the switching frequency Fsw to remain relatively fixed, line transient response is improved even in applications requiring higher switching frequencies Fsw. For example, according to a non-limiting example, the Vgap is controlled between 50 mV and 100 mV from 110 KHz to 1 MHz.

It will be appreciated by those skilled in the art having the benefit of this disclosure that this buck boost voltage converter provides for improved operation when transitioning between buck mode, buck-boost mode, and boost mode of operations. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope of the present disclosure, as defined by the following claims, and their equivalents. Thus, it is intended that the following claims be interpreted to embrace all such further modifications, changes, rearrangements, substitutions, alternatives, design choices, embodiments, and equivalents thereof.

What is claimed is:

1. A converter, comprising:
    a buck boost converter circuit configured to generate an output voltage in response to an input voltage, the buck boost converter circuit comprising:
        a current sensor coupled to an input voltage node configured to receive the input voltage, the current sensor configured to sense an input current corresponding to the input voltage;
        an upper buck transistor coupled to the input voltage node;
        an upper boost transistor coupled to an output voltage node, the output voltage node configured to output the output voltage; and
        an inductor coupled between the upper buck transistor and the upper boost transistor; and
    an inductor current compensation circuit configured to generate an output current compensated inductor current signal corresponding to the sensed input current, the output current compensated inductor current signal including a voltage gap between a boost ramp valley and a buck ramp peak,
    wherein the inductor current compensation circuit is configured to adjust the voltage gap based on an offset compensation voltage corresponding to a switching frequency.

2. The converter of claim 1, wherein the inductor current compensation circuit comprises:
    a boost ramp offset compensation circuit configured to generate the offset compensation voltage corresponding to the switching frequency; and
    a boost ramp generation circuit configured to generate a boost ramp of the output current compensated inductor current signal corresponding to the offset compensation voltage.

3. The converter of claim 2, wherein the boost ramp offset compensation circuit comprises a current mirror coupled to a current source configured to generate a current corresponding to the switching frequency, the current mirror configured to generate a mirrored current corresponding to the current generated by the current source.

4. The converter of claim 3, wherein the boost ramp offset compensation circuit further comprises a resistor coupled to receive the mirrored current from the current mirror, the resistor configured to generate a boost side adjustment voltage corresponding to the mirrored current.

5. The converter of claim 4, wherein the boost ramp offset compensation circuit further comprises an amplifier coupled to the resistor, the amplifier configured to generate the offset compensation voltage corresponding to the boost side adjustment voltage and to provide the offset compensation voltage to the boost ramp generation circuit.

6. The converter of claim 5, wherein parameters of the current mirror, the resistor, and the amplifier correspond proportionally to a total minimum on and off time in a boost cycle or a buck cycle.

7. The converter of claim 1, further comprising a mode control logic circuit configured to generate a mode control signal to control an operation mode of the buck boost converter circuit to operate in one of a buck mode, a boost mode, and a buck-boost mode,
    wherein the inductor current compensation circuit is configured to adjust a boost ramp based on the offset compensation voltage corresponding to the switching frequency when the mode control signal indicates a boost cycle within the buck-boost mode.

8. An inductor current compensation circuit configured to generate an output current compensated inductor current signal corresponding to a sensed input current provided by a buck boost converter, the inductor current compensation circuit comprising:
    a boost ramp offset compensation circuit configured to generate an offset compensation voltage corresponding to a switching frequency; and
    a boost ramp generation circuit configured to generate a boost ramp of the output current compensated inductor current signal corresponding to the offset compensation voltage,
    wherein the inductor current compensation circuit is configured to generate the output current compensated inductor current signal having a voltage gap between a boost ramp valley and a buck ramp peak, and to adjust the voltage gap based on the offset compensation voltage corresponding to the switching frequency.

9. The circuit of claim 8, wherein the boost ramp offset compensation circuit comprises a current mirror coupled to a current source configured to generate a current corresponding to the switching frequency, the current mirror configured to generate a mirrored current corresponding to the current generated by the current source.

10. The circuit of claim 9, wherein the boost ramp offset compensation circuit further comprises a resistor coupled to receive the mirrored current from the current mirror, the resistor configured to generate a boost side adjustment voltage corresponding to the mirrored current.

11. The circuit of claim 10, wherein the boost ramp offset compensation circuit further comprises an amplifier coupled to the resistor, the amplifier configured to generate the offset compensation voltage corresponding to the boost side adjustment voltage and to provide the offset compensation voltage to the boost ramp generation circuit.

12. The circuit of claim 11, wherein parameters of the current mirror, the resistor, and the amplifier correspond proportionally to a total minimum on and off time in a boost cycle or a buck cycle.

13. The circuit of claim 8, wherein the inductor current compensation circuit is configured to adjust a boost ramp based on the offset compensation voltage corresponding to the switching frequency when a mode control signal received from a mode control logic circuit indicates a boost cycle within a buck-boost mode.

14. A method for generating an output current compensated inductor current signal corresponding to a sensed input current provided by a buck boost converter circuit configured to generate an output voltage in response to an input voltage, the method comprising:
    receiving, from the buck boost converter circuit, the sensed input current corresponding to the input voltage; and
    generating the output current compensated inductor current signal corresponding to the sensed input current, the output current compensated inductor current signal having a voltage gap between a boost ramp valley and a buck ramp peak, wherein the voltage gap is adjusted based on a boost ramp offset compensation voltage corresponding to a switching frequency.

15. The method of claim 14, further comprising: generating a boost ramp of the output current compensated inductor current signal corresponding to the boost ramp offset compensation voltage.

16. The method of claim 15, further comprising:
generating a current corresponding to the switching frequency; and
generating a mirrored current based on the current corresponding to the switching frequency.

17. The method of claim 16, further comprising: generating a boost side adjustment voltage corresponding to the mirrored current.

18. The method of claim 17, further comprising:
generating the boost ramp offset compensation voltage based on the boost side adjustment voltage; and
adjusting the boost ramp of the output current compensated inductor current signal corresponding to the boost ramp offset compensation voltage to generate the voltage gap.

19. The method of claim 18, further comprising: selecting parameters of a current mirror for generating the mirrored current, a resistor for generating the boost side adjustment voltage, and an amplifier for generating the boost ramp offset compensation voltage to proportionally correspond to a total minimum on and off time in a boost cycle or a buck cycle.

20. The method of claim 14, further comprising:
receiving a mode control signal to control an operation mode of the buck boost converter circuit to operate in one of a buck mode, a boost mode, or a buck-boost mode; and
generating the output current compensated inductor current signal having the voltage gap that is adjusted corresponding to the boost ramp offset compensation voltage when the mode control signal indicates a boost cycle within the buck-boost mode.

\* \* \* \* \*